United States Patent
Clarke et al.

(10) Patent No.: US 11,941,002 B1
(45) Date of Patent: Mar. 26, 2024

(54) DYNAMICALLY SORT DATA

(71) Applicant: Amazon Technologies, Inc., Seattle, WA (US)

(72) Inventors: Michael George Clarke, Leander, TX (US); Jake Johnathan Ursetta, Highlands Ranch, CO (US); Yasaswi Vempati, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,553

(22) Filed: Mar. 31, 2022

(51) Int. Cl.
*G06F 16/2453* (2019.01)
*G06F 11/34* (2006.01)
*G06F 16/21* (2019.01)
*G06F 16/22* (2019.01)

(52) U.S. Cl.
CPC ...... *G06F 16/2453* (2019.01); *G06F 11/3419* (2013.01); *G06F 16/213* (2019.01); *G06F 16/2282* (2019.01)

(58) Field of Classification Search
CPC ............ G06F 16/2468; G06F 16/2453; G06F 16/2282
USPC ....................................................... 707/713
See application file for complete search history.

(56) References Cited

U.S. PATENT DOCUMENTS

| | | | |
|---|---|---|---|
| 7,512,595 B1 * | 3/2009 | McBride | G06F 16/20 |
| 10,268,726 B1 | 4/2019 | Schiesser | |
| 11,507,578 B2 | 11/2022 | Arnold | |
| 2003/0093772 A1 | 5/2003 | Stephenson | |
| 2004/0199533 A1 | 10/2004 | Celis et al. | |
| 2005/0060314 A1 * | 3/2005 | Wang | G06F 16/90348 |
| 2008/0059408 A1 | 3/2008 | Barsness et al. | |
| 2010/0114976 A1 | 5/2010 | Castellanos et al. | |
| 2011/0055197 A1 | 3/2011 | Chavan | |
| 2015/0235038 A1 | 8/2015 | Inoue et al. | |
| 2015/0286681 A1 | 10/2015 | Baer et al. | |
| 2016/0253402 A1 | 9/2016 | Klots et al. | |
| 2018/0089262 A1 | 3/2018 | Bhattacharjee et al. | |
| 2019/0303465 A1 | 10/2019 | Shanmugamani et al. | |
| 2020/0211106 A1 * | 7/2020 | Pan | G06Q 40/03 |
| 2021/0365300 A9 | 11/2021 | Kyaw et al. | |
| 2022/0121711 A1 | 4/2022 | Arnold | |
| 2023/0118982 A1 | 4/2023 | Collins, Jr. | |
| 2023/0161795 A1 | 5/2023 | Valt et al. | |

FOREIGN PATENT DOCUMENTS

KR 2022-0038827 A 3/2022

OTHER PUBLICATIONS

USPTO Non-Final Office Action dated Aug. 17, 2023, U.S. Appl. No. 17/548,346, 21 pages.

\* cited by examiner

*Primary Examiner* — Hung T Vy (74) *Attorney, Agent, or Firm* — Davis Wright Tremaine LLP (57) ABSTRACT

Techniques and systems can analyze information associated with instructions to sort data to determine an identifier common to at least a plurality of individual instructions to sort the data. A correspondence of the identifier to a sort identifier used to sort the data can be determined. Based on the determined correspondence, the techniques and systems can sort the data based on the identifier.

20 Claims, 7 Drawing Sheets

DYNAMICALLY SORT DATA

BACKGROUND

Online service providers can provide distributed storage as a service to their customers. In an example, an online service provider can offer a service that ingests customer data that is stored on distributed storage. The service can process the ingested data to generate formatted data that can be written to produce augmented formatted data that can be queried. However, generating formatted data that can be written to and queried efficiently and quickly is a difficult and challenging task. Data that is poorly formatted can create data write and it query bottlenecks resulting in inefficient use of compute resources.

BRIEF DESCRIPTION OF THE DRAWINGS

Various techniques will be described with reference to the drawings, in which.

DETAILED DESCRIPTION

Described techniques, systems, and apparatuses sort data that can be written to and used to process queries. Raw data can be received by compute resources of an organization, such as an online service provider. This raw data can be provided by a customer of the online service provider. The online service provider can process the raw data so that the data can be augmented with additional data and queried. However, processing raw data so it can be written to and queried efficiently is often challenging, and the process can consume significant compute resources. Furthermore, data, stored inefficiently, can create write and query bottlenecks and data churn, often resulting in unnecessary and wasteful use of compute resources. The described techniques, systems, and apparatuses aim to deliver formatted data that can be written to and queried efficiently, resulting in fewer bottlenecks and data churn known to unnecessarily consume compute resources.

Raw data can be provided. A computer-implemented service can analyze the raw data to determine a table schema for the raw data or more generally a logical schema for the raw data. Based on the table schema, the computer-implemented service can assign an identifier to each data portion in the raw data. For example, the raw data can have several columns of data. The computer-implemented service can assign an identifier to each column of data included in the raw data. The computer-implemented service generates a table of data corresponding to the raw data, where the table includes the several columns of data, and respective columns of data have an assigned identifier. These assigned identifiers can be associated with metadata linked to the table of data.

The data of the table can be augmented by data writes and the data of the table can be queried. However, writing data to the data of the table can be inefficient because the entirety of the data or a large portion of the data is analyzed to effectuate the writing of the data. Furthermore, queries against the data of the table can be inefficient because the entirety of the data should be processed in order to return comprehensive query results. Thus, it is beneficial to sort the data before it is written to or queried. By sorting the data, the computer-implemented service can limit an amount of data scanned by each data write and/or query process, thus improving performance and reducing cost.

An identifier can be used as a basis to sort the data in the table. The identifier should correspond to a predicate, such a column identifier or name associated with the data in the table that will occur frequently in data writes that augment data in the table, queries against the data in the table, and/or when the data in the table is caused to be sorted. Unfortunately, such an identifier is often unknown to the customer providing the raw data and the developer associated with the computer-implemented service that provides storage of the data in the table. Therefore, customers and developers routinely select a less than optimum identifier, such as a column identifier or name, for sorting the data in the table during an intake process of the raw data. One or more of the described implementations can dynamically sort data in a table.

As described, raw data can be processed to generate a table of data. The table of data can be generated based on a table schema. This table schema can be stored in metadata associated with the table of data. The metadata can include identifiers associated with columns of data contained in the table of data. For example, a first identifier can be associated with a first column of data in the table of data and a second identifier can be associated with a second column of data in the table of data.

A computer-implemented service, provided by an online service provider, can subjectively or randomly select one of the first or second identifiers to sort the data in the table. Alternatively, a customer representative or developer of the online service provider can subjectively or randomly select one of the first or second identifiers as that is used to sort the data in the table. The computer-implemented service can write the chosen identifier for sorting the data to the metadata associated with the table of data. The identifier that is used as the basis for sorting the data in the table can be referred to herein as a sort identifier, sort predicate, or simply an identifier in some embodiments. In some examples, the identifier is one of a plurality of column names associated with columnar data of the table of data.

The computer-implemented service can sort the data in the table based on the subjectively chosen sort identifier. Once the initial sorting of the data in the table is achieved using the subjectively selected sort identifier, the computer-implemented service can process data writes to augment the data in the table with additional or new data. the computer-implemented service can also process queries against the data in the table. A process of writing data to the data in the table and/or querying the data in the table can involve sorting the data in the table. For example, the data in the table might be sorted before writing data to the data in the table and/or querying the data in the table. A sort identifier can be provided to allow the computer-implemented service to sort the data in the table. Instructions to sort the data in the table can be provided to the computer-implemented service by a user, such as a customer of the computer-implemented service or a developer that is associated with the computer-implemented service. The instructions to sort the data in the table can be in the form of a syntax, such as a syntax that includes an "order by" clause. In at least one example, the "order by" clause can be provided in a "select" instruction created by a user or developer.

Identifiers, such as sort identifiers, can be aggregated. Specifically, sort identifiers associated with sorting the data of the table can be aggregated or collected over some period of time. In an example, the computer-implemented service that processes sorts of the data in the table can aggregate the identifiers associated with those sorts over a predetermined time period, such as a time period in minutes, hours, or days. The aggregated identifiers can be analyzed by the computer-implemented service to determine the most commonly occurring identifier in the aggregated sort identifiers. The aggregated identifiers can be stored as sort information that can referred to or referenced by the computer-implemented system.

The determined most commonly occurring sort identifier can be compared to the sort identifier order used to sort the data in the table. The computer-implemented service can make such a comparison. When the sort identifier used to sort the data in the table corresponds to or matches the determined most commonly occurring sort identifier, the computer-implemented service can ascertain that the sort identifier chosen to sort the data in the table was suitably chosen. However, when the sort identifier used to sort the data in the table does not correspond to or match the determined most commonly occurring sort identifier determined from the aggregated sort identifiers, the computer-implemented system can sort (i.e., re-sort) the data in the table. The computer-implemented system can sort the data in the table using the determined most commonly occurring sort identifier. Sorting the data in the table using the determined most commonly occurring sort identifier can involve updating metadata of the table to include a sort identifier. Specifically, the most commonly occurring sort identifier, in at least one implementation, is used as the sort identifier for sorting the data in the table. In at least one example, the sort identifier is used to generate an additional table of data, sorted based on the sort identifier, corresponding to the data of the table.

A computer-implemented service, provided by an online service provider, can provide multiple tables of data corresponding to data in a table. The computer-implemented service can determine that a customer's data is sorted using a particular sort identifier over various timeframes during a month or year, for example. The computer-implemented service can make this determination by analyzing information associated with aggregated sort identifiers (e.g., historical sort data) to identify one or more commonly used sort identifier. One of the multiple tables of data, sorted using a sort identifier corresponding to a sort identifier commonly used during an identified timeframe, can be made available by the computer-implemented service to process data writes to data and/or queries on the data. Once that timeframe has lapsed, another of the multiple tables of data can be made available by the computer-implemented service to process data writes to data and/or queries on the data. Thus, the described techniques can provide tables of data corresponding to spikes in data sort behavior determined based on historical sort data corresponding to a sort identifier that is likely to be used to sort data over a particular timeframe.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
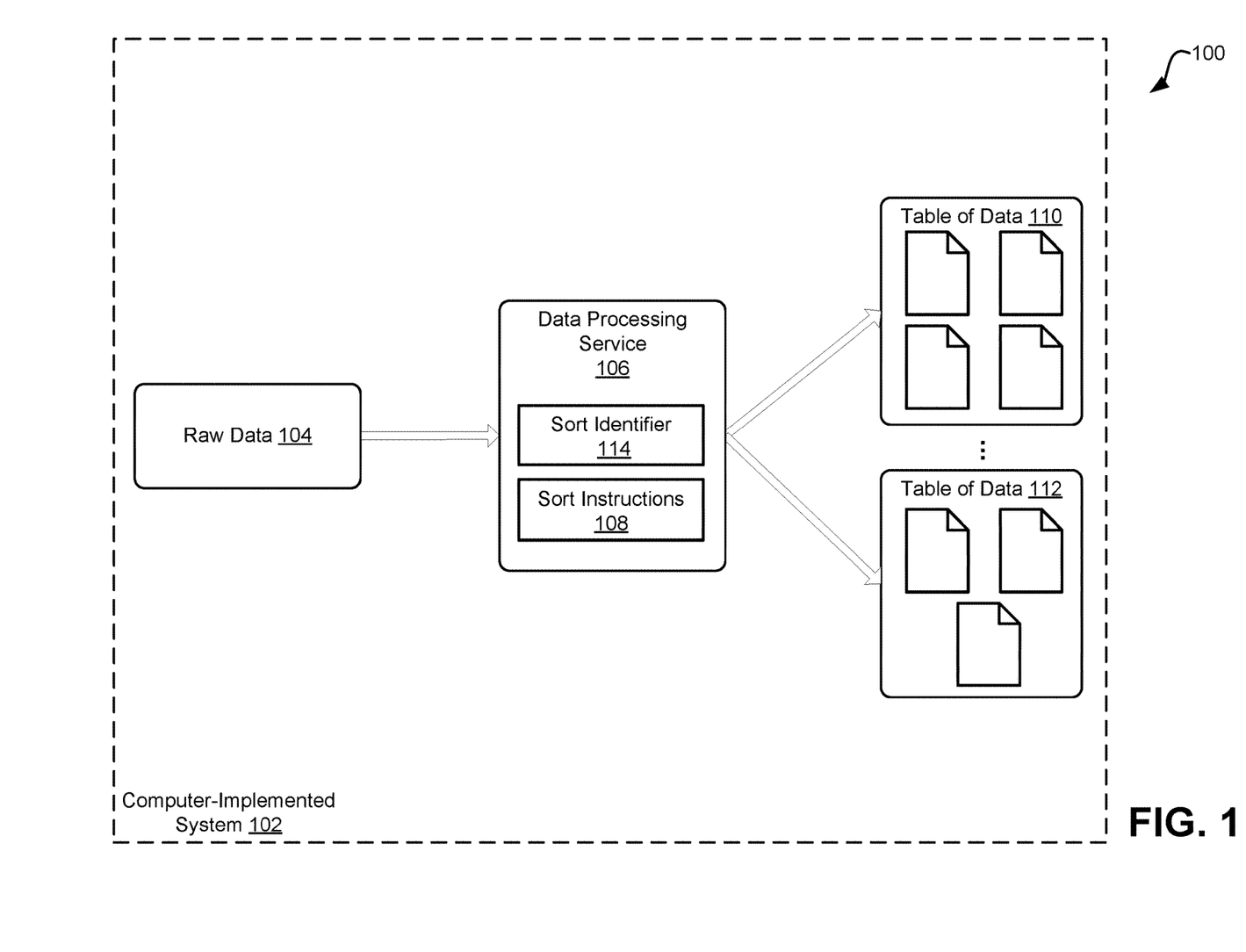
FIG. 1 illustrates an example system environment that can sort data, according to at least one embodiment.

FIG. 1 illustrates an example system environment 100 that can sort data, according to at least one embodiment. The example system environment 100 can include a computer-implemented system 102. The computer-implemented system 102 can comprise various computational resources, including virtual computer instances, applications, services, processes, web servers, computer storage, database instances, networking components, and so on. In some embodiments, the computer-implemented system 102 can be hosted in the cloud by an online service provider.

The computer-implemented system 102 can comprise hosted multi-tenant provider networks. The computer-implemented system 102 can be associated with a number of networks, such as the Internet and/or one or more private networks. Clients, such as client computing devices or other interfaces, can use the network to interface with the computer-implemented system 102. Clients can include entities or individuals that contract with an operator associated with the computer-implemented system 102 to obtain computational services provided by the operator of the computer-implemented system 102. In some embodiments, the client can be resource owners, resource developers, compliance managers, other users or entities, and so on.

The computer-implemented system 102 can host raw data 104. This raw data 104 can be hosted by one or more computer-implemented storages associated with the computer-implemented system 102. In at least one embodiment, the raw data 104 is associated with a customer of the online service provider that provides the computer-implemented system 102.

The raw data 104 can be processed by a data processing service 106. The data processing service 106 can process the raw data 104 to generate a table of data. In at least one embodiment, the data processing service 106 is implemented by computer-executable instructions. The data processing service 106 can be implemented by a combination of computer-executable instructions and hardware, such as specialized hardware that includes the computer-executable instructions and one or more processors to execute the computer-executable instructions. The data processing service 106 can analyze the raw data 104 to determine a table or logical schema for the raw data 104. Based on the table or logical schema, the data processing service 106 can assign an identifier to each data portion in the raw data 104. For example, the raw data 104 can have several columns of data associated with columnar data of the raw data 104. The data processing service 106 can assign an identifier to each column of data included in the raw data 104. The data processing service 106 generates the table of data corresponding to the raw data 104, where the table includes the several columns of data and respective columns of data have an assigned identifier. These assigned identifiers can be associated with metadata linked to the table of data.

An identifier can be used to sort the data in the table. The identifier can correspond to a column identifier. The identifier is used to sort the data in the table should correspond to a sort identifier or other metadata linked to write data frequently associated with data writes made to the data in the table. Alternatively, or in addition, the identifier should correspond to a query predicate or search term frequently associated with search requests made against the data in the table. Unfortunately, the sort identifier is often unknown to the customer providing the raw data 104 and the developer associated with the data processing service 106 that provides capability to store data. Therefore, customers and developers routinely select a less-than-optimum sort identifier to sort the data in the table. One or more of the described implementations can dynamically select a sort identifier to sort the data in the table.

As described, the raw data 104 can be processed to generate a table of data. The table of data can be generated based on a table schema. This table schema can be stored in metadata associated with the table of data. The metadata can include identifiers associated with columns of data contained in the table of data. For example, a first identifier can be associated with a first column of data in the table of data and a second identifier can be associated with a second column of data in the table of data.

The data processing service 106 can subjectively or randomly select one of the first or second identifiers that can be used to sort the data in the table. Alternatively, a customer representative or developer of the online service provider can subjectively or randomly select one of the first or second identifiers that can be used to sort the data in the table. The data processing service 106 can write sort identifier to the metadata associated with the table of data.

The data processing service 106 can sort the data in the table based on the subjectively selected sort identifier (not illustrated). Once the initial sorting of the data in the table is achieved using the subjectively selected sort identifier, the data processing service 106 can process one or more sort instructions 108 to sort the data in the table. Each of the sort instructions 108 can be analyzed to determine an associated identifier, such as a sort identifier. In an embodiment, the identifier can be determined directly from the language used to sort the data in the table. In an implementation, the language identifies the sort identifier, such as when the language is written in a predefined format or schema recognized by a database system hosting the data in the table. In at least one embodiment, the sort identifier identified in the language corresponds to a column identifier of a table of data, such as one of the tables of data 110-112.

Sort identifiers associated with the sort instructions 108 to sort the data of the table can be aggregated by the data processing service 106. The aggregated sort identifiers can be saved as sort information by the data processing service 106. Specifically, identifiers associated with the sort instructions 108 to sort the data of the table can be aggregated or collected over some period of time. In an example, the data processing service 106 that processes sort instructions 108 to sort data can aggregate the sort identifiers associated with those sort instructions 108 over a predetermined time period, such as a time period in minutes, hours, or days. The aggregated identifiers can be analyzed by the data processing service 106 to determine the most commonly occurring sort identifier in the aggregated identifiers.

The determined most commonly occurring sort identifier can be compared to the sort identifier (e.g., column identifier) used to sort the data in the table. The data processing service 106 can make such a comparison. When the identifier used to sort the data in the table corresponds to or matches the determined most commonly occurring sort identifier, the data processing service 106 can ascertain that the identifier chosen to sort the data in the table was suitably chosen. However, when the sort identifier used to sort the data in the table does not correspond to or match the determined most commonly occurring sort identifier determined from the aggregated sort identifiers, the data processing service 106 can sort (i.e., re-sort) the data in the table to generate the at least one sorted table of data including, for example, the at least 1 of the tables of data 110-112. The number of sorted tables of data (e.g., the tables of data 110-112) illustrated in FIG. 1 is one example of the number of tables of data that can be generated.

The data processing service 106 can one or more tables of data using the determined most commonly occurring sort identifier. Sorting the data in the table using the determined most commonly occurring sort and identifier can involve updating metadata of the table to include a sort identifier 114. Specifically, the most commonly occurring identifier, in at least one implementation, is used as the sort identifier 114 for sorting the data in the table. In at least one example, the sort identifier 114 is used to sort at least of the tables of data 110-112.

As illustrated, the data processing service 106 can provide multiple tables of data 110-112. The data processing service 106 can determine that a customer's data is sorted using a particular sort identifier or identifiers over various timeframes during a month or year, for example. The data processing service 106 can make this determination by analyzing aggregated sort identifiers (e.g., historical sort information information), determined from the sort instructions 108, to identify one or more commonly used sort identifiers. One of the multiple tables of data, sorted using a sort identifier corresponding to a sort identifier commonly used during an identified timeframe, can be made available by the computer-implemented service to process data writes and queries. Once that timeframe has lapsed, another of the multiple tables of data can be made available by the processing service 106 to process data writes and queries. Thus, the described techniques can sort data corresponding to spikes in data sorting behavior determined based on historical data sorting behavior and/or sort data corresponding to a sort identifier that is likely to be associated with user requests to sort data over a particular timeframe.

Figure 2:
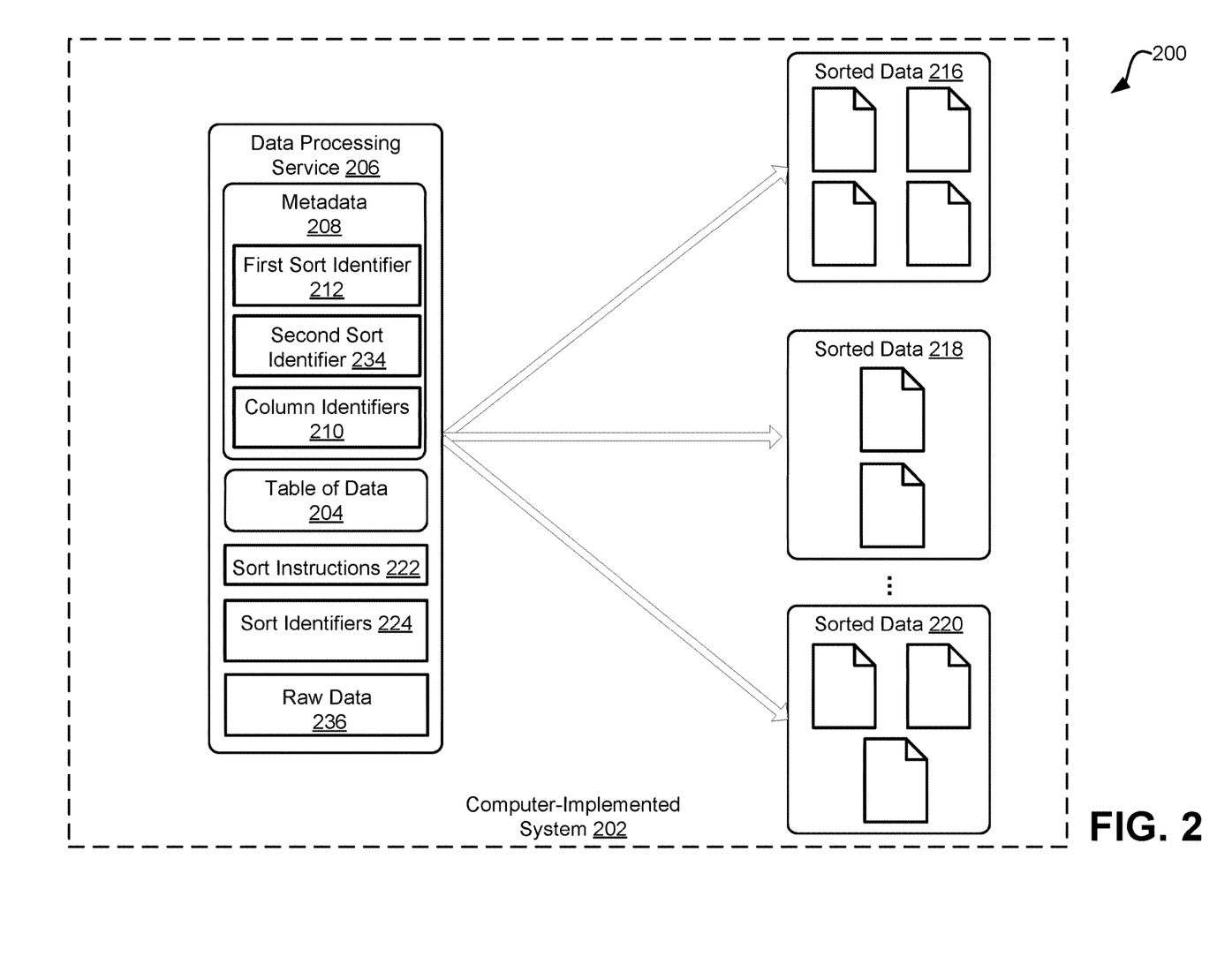
FIG. 2 illustrates another example system environment that can sort data, according to at least one embodiment.

FIG. 2 illustrates an example system environment 200 that can sort data, according to at least one embodiment. The example system environment 200 can include a computer-implemented system 202. The computer-implemented system 202 can comprise various computational resources, including virtual computer instances, applications, services, processes, web servers, computer storage, database instances, networking components, and so on. In some embodiments, the computer-implemented system 202 can be hosted in the cloud by an online service provider.

The computer-implemented system 202 can comprise hosted multi-tenant provider networks. The computer-implemented system 202 can be associated with a number of networks, such as the Internet and/or one or more private networks. Clients, such as client computing devices or other interfaces, can use the network to interface with the computer-implemented system 202. Clients can include entities or individuals that contract with an operator associated with the computer-implemented system 202 to obtain computational services provided by the operator of the computer-implemented system 202. In some embodiments, the client can be resource owners, resource developers, compliance managers, other users or entities, and so on.

A table of data 204, also referred to as table 204, can be processed by a data processing service 206. In at least one embodiment, the table of data 204 is generated from raw data 236. In at least one embodiment, the data processing service 206 is implemented by computer-executable instructions. The data processing service 206 can be implemented by a combination of computer-executable instructions and hardware, such as specialized hardware that includes the computer-executable instructions and one or more processors to execute the computer-executable instructions. The data processing service 206 can access onboard computer-implemented storage. Alternatively, or in addition, the data processing service 206 can access external computer-implemented storage, such as computer-implemented storage provided by the computer-implemented system 202. Described data, such as data in tables of data, information pertaining to sorting data, sorting data in a table, metadata, sorted data or dataset(s), and so forth, can be stored in computer-implemented storage by one or both of the data processing service 206 and the computer-implemented system 202.

The data processing service 206 can generate the table of data 204 based on a table schema. Based on the table schema, the data processing service 206 can assign an identifier to each data portion included in the table of data 204. For example, the table of data 204 can have several columns of data and rows of data that span the columns of data. The data processing service 206 can assign an identifier to each column of data included the table of data 204. In at least one embodiment, the data processing service 206 generates the table of data 204 based on analysis of the raw data 236, where the table of data 204 includes several columns of data and respective columns of data each have an assigned identifier. These assigned column identifiers 210 can be associated with metadata 208, which is linked to the table of data 204. The foregoing description of the table of data 204 and its associated identifiers suggests that the table of data 204 is to be horizontally structured. One or more of the described embodiments are not limited to horizontally structured data. Rather, one or more of the described embodiments can support vertically structured data, and other structured data.

The data of the table 204 can be sorted based on a sort identifier. However, data writes to the data of the table 204 and queries on the date of the table 204 can be inefficient when the data of the table 204 is sorted inefficiently. A sort identifier or other identifier can be used to sort the table of data 204. The sort identifier should correspond to one or more identifiers of the table of data 204, such a table column identifier that will be used frequently when sorting the date of the table 204. Unfortunately, such a sort identifier is often unknown to a customer and/or the developer associated with the computer-implemented service 202 that provides capability store data. Therefore, customers and developers routinely select a less-than-optimum sort identifier to sort the table of data 204. One or more of the described embodiments can dynamically select a identifier to sort data.

The data processing service 206 can subjectively or randomly select one of the column identifiers 210 as a sort identifier (i.e., first sort identifier 212) or some other identifier that can be used to sort data in the table of data 204. Alternatively, a customer representative or developer of an online service provider associated with the computer-implemented system 202 can subjectively or randomly select one of the first or second identifiers as the first sort identifier 212 or some other identifier that can be used to sort the data in the table of data 204. The data processing service 206 can write the first sort identifier 212 to the metadata 208 associated with the table of data 204.

Once the initial sorting of the data in the table 204 is achieved using the subjectively selected identifier (i.e., the first sort identifier 212), the data processing service 206 can process data writes to augment data in the data of the table 204, process queries against the data in the table 204, and/or sort the data in the table 204 based on one or more user requests. Data rates and/or queries against the dad in the table 204 can also include instructions to sort the data in the table 204. Sort instructions 222 can be analyzed to determine an associated sort identifier. For example, a sort identifier associated with the sort instructions 222, which may be associated with data writes, queries, and the like, can be analyzed to determine one or more sort identifiers used to sort the table of data 204. In at least one embodiment, the sort identifier can be determined directly from the sort language of one or more of the data writes, queries, and/or sort instructions. In an implementation, the sort language or instruction identifies the sort identifier, such as when the language or instruction is written in a predefined format or schema recognized by a database system hosting the data in the table 204.

Identifiers 224, determined as described herein, associated with the sort instructions 222 to sort the data of the table 204 can be aggregated. The data processing service 206 can generate the aggregated identifiers (i.e., the sort identifiers 224). Specifically, the sort identifiers 224 associated with sort instructions 222 for the data of the table 204 can be aggregated or collected over some period of time. In an example, the data processing service 206 that processes the sort instructions 222 to the data of the table 204 can aggregate the identifiers 224 associated with those sort instructions 222 over a predetermined time period, such as a time period in minutes, hours, or days. The aggregated identifiers 224 can be analyzed by the data processing service 206 to determine the most commonly occurring identifier in the aggregated identifiers 224.

The determined most commonly occurring sort identifier can be compared to the first sort identifier 212 used to generate table data 204. The data processing service 206 can make such a comparison. When the first sort identifier 212 used to sort the data in the table 204 corresponds to or matches the determined most commonly occurring sort identifier, the data processing service 206 can ascertain that the first sort identifier 212 chosen to sort the data in the table 204 was suitably chosen. However, when the first sort identifier 212 used to sort the data in the table 204 does not correspond to or match the determined most commonly occurring sort identifier determined from the aggregated sort instructions 222, the data processing service 206 can sort (i.e., re-sort) the data in the table 204 to generate one or more additional tables of data, such as tables associated with sorted data 216-220, also referred to herein as sorted datasets 216-220. In at least one embodiment, the data processing service 206 can simply re-sort the data in the table 204 to generate a re-sorted table data 204.

The data processing service 206 can sort the data in the table 204 using the determined most commonly occurring sort identifier. Sorting the data in the table 204 using the determined most commonly occurring sort identifier can involve updating metadata 208 of the table 204 to include a second sort identifier 234. Specifically, the most commonly occurring sort identifier, in at least one embodiment, is used as the second sort identifier 234 for the data in the table 204. In at least one example, the second sort identifier 234 is used to generate one or more of the sorted datasets 216-220, which may correspond to the data of the table 204. In at least one embodiment, the sorted datasets 216-220 are retained, thereby providing multiple sets of sorted data. The number of illustrated sort identifiers and/or the number of illustrated sorted data can be greater than or less than those that are illustrated and described hereby.

The data processing service 206 can maintain multiple sets of sorted data or datasets, such as multiple tables of data, corresponding to data in the table 204, such as at least the sorted datasets 216-220. The data processing service 206 can determine that a customer's data is sorted using a particular sort identifier or a sort identifiers over various timeframes, such over a particular day or days each month or one or more hours some of the days during the month. The data processing service 206 can make this determination by analyzing the aggregated sort instructions 222 (e.g., historical sort information) to identify one or more commonly used identifiers. One of the multiple sorts of data (e.g., sort 214 or 226), sorted using a sort identifier (e.g., first or second sort identifier 212, 234) corresponding to a sort identifier commonly used during an identified timeframe, can be made available by the data processing service 206 to when processing data writes. In at least one embodiment, the data processing service 206 can sort data in the table 204 based on one or more identified commonly used identifiers. Once that timeframe has lapsed, another of the multiple sorted datasets can be made available by the data processing service 206 to process data writes and/or queries. Thus, the described techniques can provide sorted data corresponding to spikes in data write, query, and/or data sorting behavior determined based on historical data sorting behavior and/or sorting of data corresponding to a sort identifier that is likely to occur in association with data write, query, and/or data sorting processed over a particular timeframe. In at least one embodiment, the data processing service 206 is associated with a database system, such as Hive, Apache Iceberg, Glue, and so forth.

In at least one embodiment, a data retention threshold or parameter can be established or selected by a customer and/or developer associated with the computer-implemented system 102 or 202. The data retention threshold or parameter can be linked to sorted data, such as sorted data described herein and including one or more of the described tables of data and/or sorted data. In at least one embodiment, the data retention threshold or parameter specifies a length of time for retaining sorted data. For example, the data retention threshold or parameter can specify a length of time for retaining sorted data in minutes, hours, days, or some other time period. When the length of time lapses, in at least one embodiment, sorted data linked to the data retention threshold or parameter can be removed from the computer-implemented system or caused to be persisted in computer-implemented storage. In at least one embodiment, when the length of time lapses, sorted data linked to the data retention threshold or parameter can be moved from volatile computer-implemented storage to nonvolatile computer-implemented storage.

In at least one embodiment, the data retention threshold or parameter corresponds to usage of sorted data, such as sorted data described herein and including one or more of the described tables of data and/or sorted data. For example, the data retention threshold or parameter can specify a sort, reads and/or writes value. This data retention threshold or parameter specifying the sort, reads and/or writes value can be linked to sorted data. A service, such as the data the service 106 and/or 206, can logs sorts, reads and/or writes against the sorted data and periodically, based on a defined schedule, compare the logged sorts, reads and/or writes against the data retention threshold or parameter specifying the sort, reads, and/or writes value. When the logged sorts, reads and/or writes are not at least equal to the data retention threshold or parameter specifying the sort, reads and/or writes value, the service can delete or persist the sorted data linked to the data retention threshold or parameter specifying the sort, reads, and/or writes value. However, when the logged reads and/or rights are at least equal to the data retention threshold or parameter specifying the sort, reads, and/or writes value, the service can maintain, in computer-implemented storage, the sorted data linked to the data retention threshold or parameter specifying the reads and/or writes value.

In at least some embodiments, the sorted data and/or sorted datasets, such as the tables of data 110-120 and/or sorted data 216-220, can be associated with one or more partitions of data. For example, one or more partitions of data can comprise sorted tables of data and/or sorted data sorted based on a randomly or subjectively selected one or more sort identifiers. Subsequently, the one or more partitions of data can comprise sorted tables of data and/or sorted data sorted based on one or more sort identifiers identified based on accumulated or aggregated sort instructions or sort identifiers leveraged to sort data of one or more tables of data or datasets. Such one or more tables of data or datasets can be stored by a partition of data, or the one or more tables of data or datasets can be stored by a plurality of partitions of data. The data of the partitions of data can be partitioned based on one or more identifiers associated with the data, such as one or more data identifiers, column identifiers, row identifiers, or some other identifier associated with a logical schema (e.g., table schema) used to format the data of the partitions of data.

Figure 3:
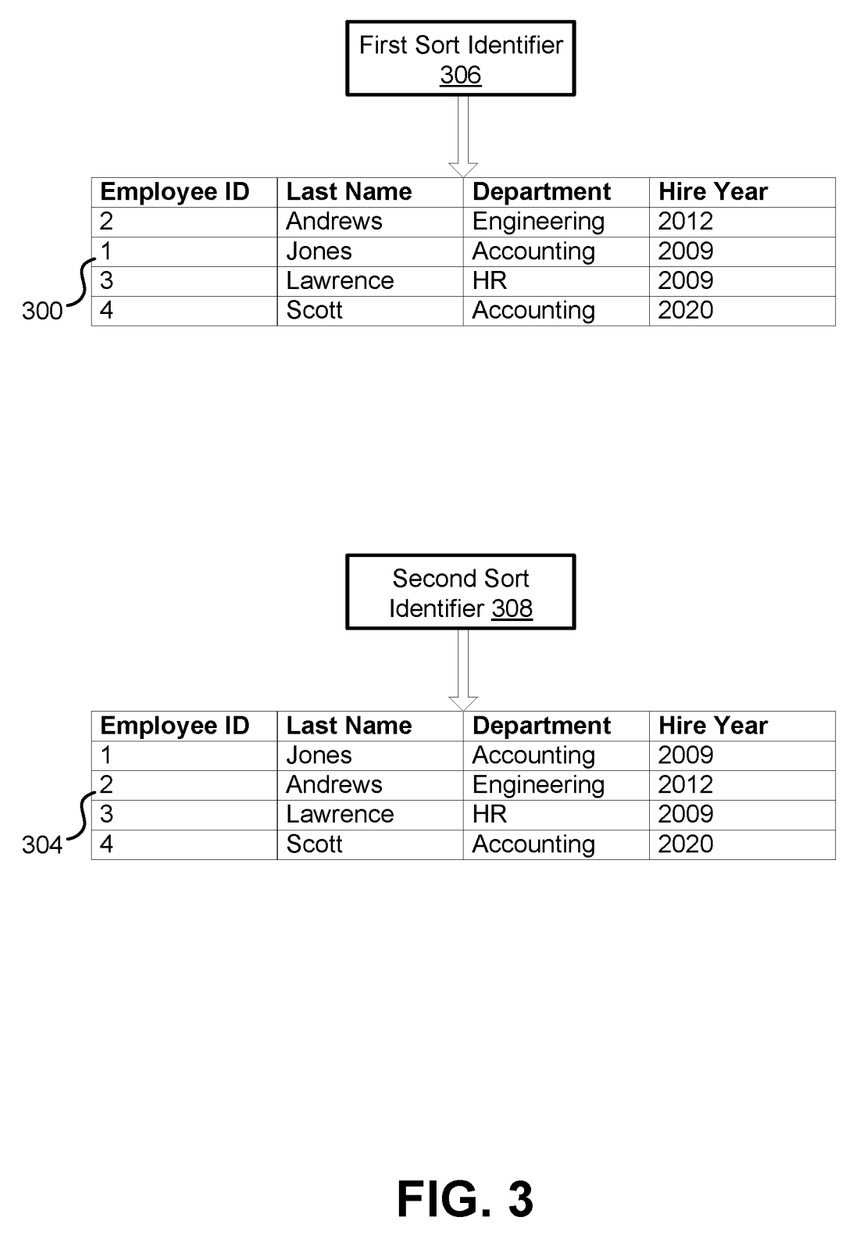
FIG. 3 illustrates data of a table that can be sorted, according to at least one embodiment.

FIG. 3 illustrates data of a table 300 that can be sorted according to at least one embodiment. While the table 300 is illustrated and described to include a particular formatting, certain data, etc., it should be understood that the described embodiments can sort data that is formatted differently than described and illustrated. Moreover, it is to be understood that the described embodiments can sort data in any quantity and in any format.

In at least one embodiment, the table 300 is generated and/or processed using the computer-implemented system 102 or the computer-implemented system 202. In at least one embodiment, data of the table 300 is sorted with a subjectively or randomly selected sort identifier (e.g., a first sort identifier 306). In particular, the data of the table 300 is sorted using the column identifier "Last Name" as the sort identifier. In at least one embodiment, the sort identifier "Last Name" is selected randomly by a data processing service, such as the data processing service 106 or the data processing service 206. Alternatively, the sort identifier "Last Name" can be subjectively chosen by a customer that provided the data of the table 300 or a data scientist of an online service provider.

According to at least one embodiment, analysis of data sorting, such as accumulated data sort information, performed via a computer-implemented system can indicate that data writes and/or queries on the data of the table 300 can be optimized if the data of the table 300 is sorted based on the column identifier "Employee ID."

In at least one embodiment, data of the table 300 is sorted (e.g., re-sorted) based on the analysis of the data sort information to generate the table 304. While the table 304 is illustrated and described to include a particular formatting, certain data, etc., it should be understood that the described embodiments can sort data that is formatted differently than described and illustrated. Moreover, it is to be understood that the described embodiments can sort data in any quantity and in any format. The table 304 sorted using the column identifier "Employee ID" as the sort identifier (e.g., a second sort identifier 308).

Figure 4:
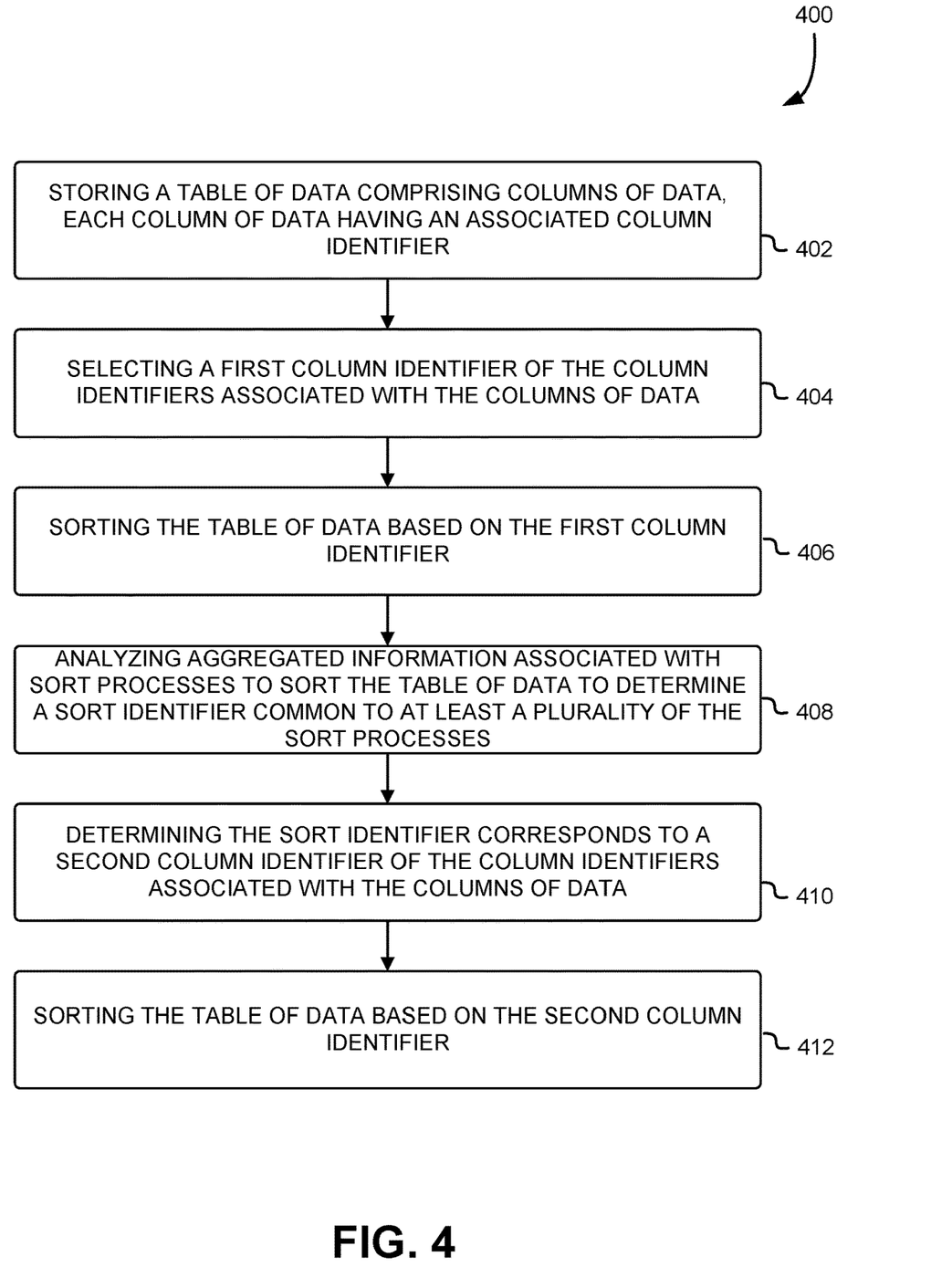
FIG. 4 illustrates an example flow diagram that may be associated with one or more of the described system environments to generate sorted data, according to at least one embodiment.

FIG. 4 illustrates an example flow diagram 400 that may be associated with one or more of the described system environments to generate sorted data or sorted datasets, according to at least one embodiment. In some implementations, the acts of the flow diagram 400 are executed by one or more computing devices of the example system environments described herein. The example system environments may execute computer-executable instructions incorporating at least some of the processing acts of the flow diagram 400 to provide generation and use of sorted data according to at least one of the embodiments described herein.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules might be implemented in software, in firmware, in special-purpose digital logic, and any combination thereof.

At 402, data is stored. In at least one embodiment, the data comprises columns of data. Each column of data can have an associated column identifier. In at least one embodiment, the data is associated with a table. For example, the data can be associated with the table of data 204. The table of data 204 can be generated from raw data, such as the raw data 104 or raw data 236. In at least one embodiment, the column identifiers can be included in metadata. For example, the column identifiers can be included in the metadata 208. In at least one embodiment, a data processing service stores the data. The data processing service can correspond to the data processing service 106 or the data processing service 206.

At 404, a sort identifier is selected or generated. In at least one embodiment, the generated sort identifier corresponds to the sort identifier 114 or the first sort identifier 212. In at least one embodiment, the sort identifier is generated or selected based on a first column identifier of a plurality of column identifiers associated with columns of data. In at least one embodiment, the sort identifier is generated or selected from column identifiers included in metadata, such as the metadata 208. In at least one embodiment, the sort identifier is generated or selected by the data processing service 106 or the data processing service 206.

At 406, the data is processed to sort the data based on the sort identifier. In at least one embodiment, the data processing service 106 or the data processing service 206 sorts the data to generate sorted data, such as the table data 204, sorted data 216-220, and/or tables of data 110-112. In at least one embodiment, the sorted data is generated from a table of data. In at least one embodiment, the data processing service 106 or the data processing service 206 perform the sorting of the data.

At 408, aggregated information associated with sort processes is analyzed. In at least one embodiment, the aggregated information is generated from a plurality of sort processes to sorted data generated from a randomly or subjectively chosen sort identifier. In at least one embodiment, analysis of the aggregated information is to determine a sort identifier common to or associated with at least a plurality of sort processes. In at least one embodiment, the data processing service 106 or the data processing service 206 the aggregated information associated with the sort processes. In at least one embodiment, the data processing service 106 or the data processing service 206 determines the sort identifier common to or associated with at least a plurality of the sort processes.

At 410, it is determined that the sort identifier common to or associated with at least a plurality of the aggregated data write information corresponds to a second column identifier of the column identifiers associated with the columns of data. In at least one embodiment, the correspondence is determined by analyzing metadata associated with the table of data. In at least one embodiment, the correspondence is determined by analyzing the metadata 208 associated with the table of data 204. In at least one embodiment, the sort identifier common to or associated with at least a plurality of the sort processes is determined by the data processing service 106 or the data processing service 206.

At 412, the table data is sorted based on the second column identifier. In at least one embodiment, the second sort identifier is generated based on the second column identifier comprised in metadata of the table of data. In at least one embodiment, the second sort identifier is generated based on analysis of the table data to locate one or more column identifiers. In at least one embodiment, the metadata 208 of the table of data 204 comprises the second column identifier. In at least one embodiment, the other sort identifier is associated with the metadata 208. The other sort identifier can replace a sort identifier already included in the metadata. Alternatively, the other sort identifier can be added to the metadata, resulting in multiple sort identifiers being associated with the metadata.

Additional acts can be associated with the flow diagram 400. One or more computer-implemented aspects of the computer-implemented systems 102 and/or 202 can implement the acts of the flow diagram 400 and/or the additional acts described in the following. In at least one embodiment, the acts can include storing sort information over a predetermined duration to generate the aggregated information associated with the sort processes to sort the table of data; analyzing the aggregated information associated with the sort processes to sort the table of data to determine a percentage corresponding to a determined number of times the sort identifier was used to sort the table of data; determining the percentage at least equals a percentage threshold; and based on determining the percentage at least equals the percentage threshold, sorting the table of data based on the second column identifier. In at least one embodiment, the acts can include processing data writes or queries on the table of data sorted using the second column identifier for a duration corresponding to a predetermined duration; determining the duration has lapsed; and based on determining the duration has lapsed, processing data writes or queries on a table of data sorted using the first column identifier.

Figure 5:
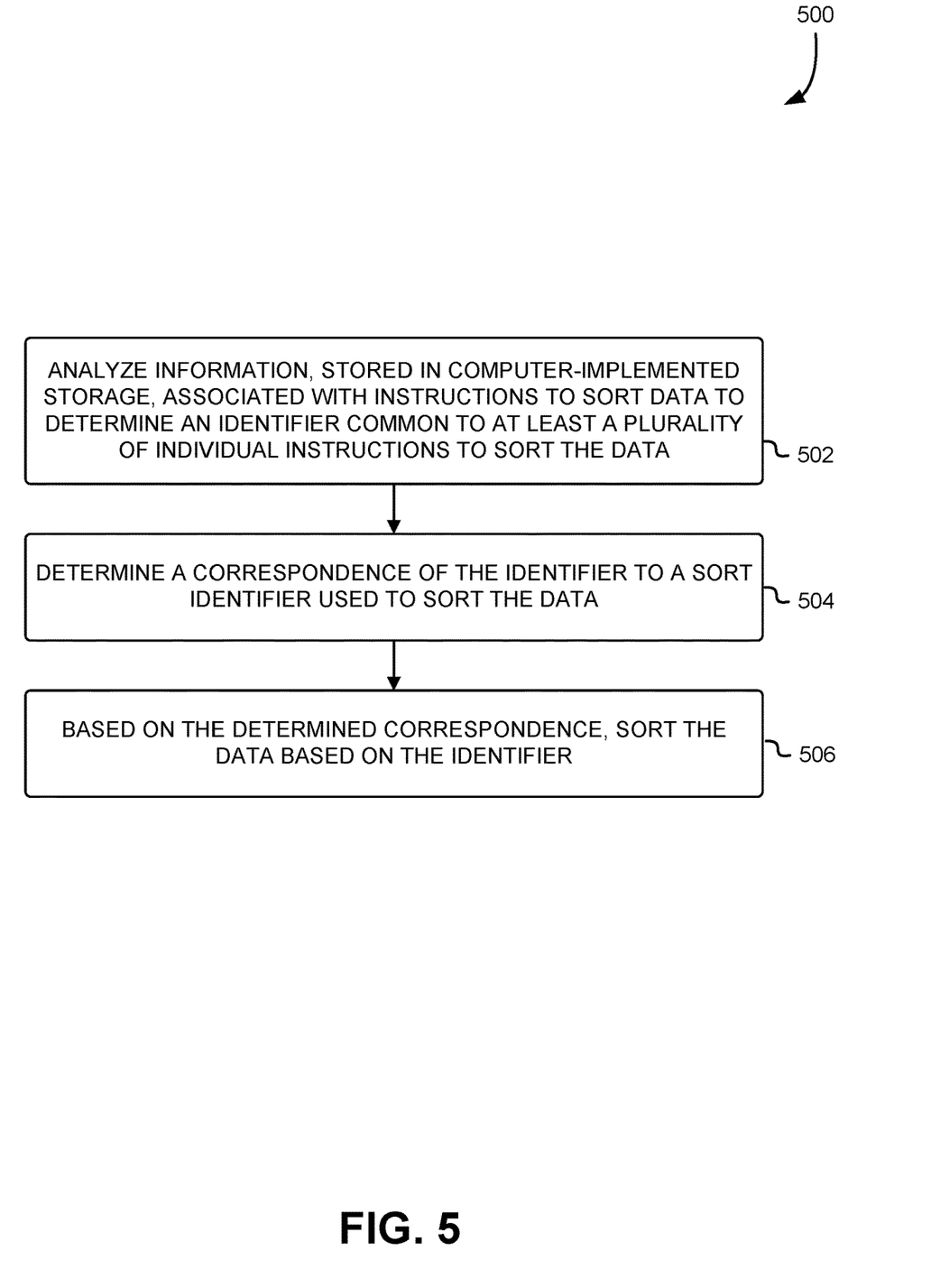
FIG. 5 illustrates an example flow diagram that may be associated with one or more of the described system environments to generate sorted data, according to at least one embodiment.

FIG. 5 illustrates an example flow diagram 500 that may be associated with one or more of the described system environments to generate sorted data, according to at least one embodiment. In some implementations, the acts of the flow diagram 500 are executed by one or more computing devices of the example system environments described herein. The example system environments may execute computer-executable instructions incorporating at least some of the processing acts of the flow diagram 500 to provide generation and use of sorted data, according to at least one of the embodiments described herein.

At 502, information, stored in computer-implemented storage, associated with instructions is analyzed to sort data to determine an identifier common to at least a plurality of individual instructions to sort the data. In at least one embodiment, the data processing service 106 or the data processing service 206 can perform the analysis. In at least one embodiment, the identifier corresponds to the first sort identifier 212.

At 504, a correspondence of the identifier to a sort identifier used to sort the data is determined. In at least one embodiment, the correspondence is determined by the data processing service 106 or the data processing service 206. In at least one embodiment, determining the correspondence comprises determining the sort identifier is associated with a second sort identifier rather than a first sort identifier. In at least one embodiment, the second sort identifier corresponds to the second sort identifier 234 or the sort identifier 116, and the first sort identifier corresponds to the first sort identifier 212.

At 506, the data is sorted based on the identifier. In at least one embodiment, the data is sorted based on the determined correspondence. In at least one embodiment, the data sorted based on the identifier corresponds to the any one or more of the tables of data 110-112, the table data 204, and/or the assorted data 216-220.

Additional acts can be associated with the flow diagram 500. For example, in at least one embodiment, additional acts can include generating, randomly, the sort identifier based on a first identifier associated with a first structured data set of the data; and generating another sort identifier based on a second identifier associated a second structured data set of the data. In at least one embodiment, additional acts can include selecting, randomly, the sort identifier based on a data identifier associated with a portion of structured data associated with the data. In at least one embodiment, additional acts can include analyzing the information to determine a percentage corresponding to a determined number of times the identifier was found to be associated with the instructions to sort data over a predetermined duration; and based on determining the percentage at least equals a percentage threshold, sorting the data based on the identifier. At least one embodiment, additional acts can include processing first real-time data writes or queries to data sorted based on the identifier for a duration corresponding to a predetermined duration; determining the duration has lapsed; and based on determining the duration has lapsed, processing second real-time data writes or queries to the data sorted based on the sort identifier. In at least one embodiment, the additional acts can include determining the predetermined duration from historical information determined from at least the plurality of individual instructions to sort the data based on the identifier.

Figure 6:
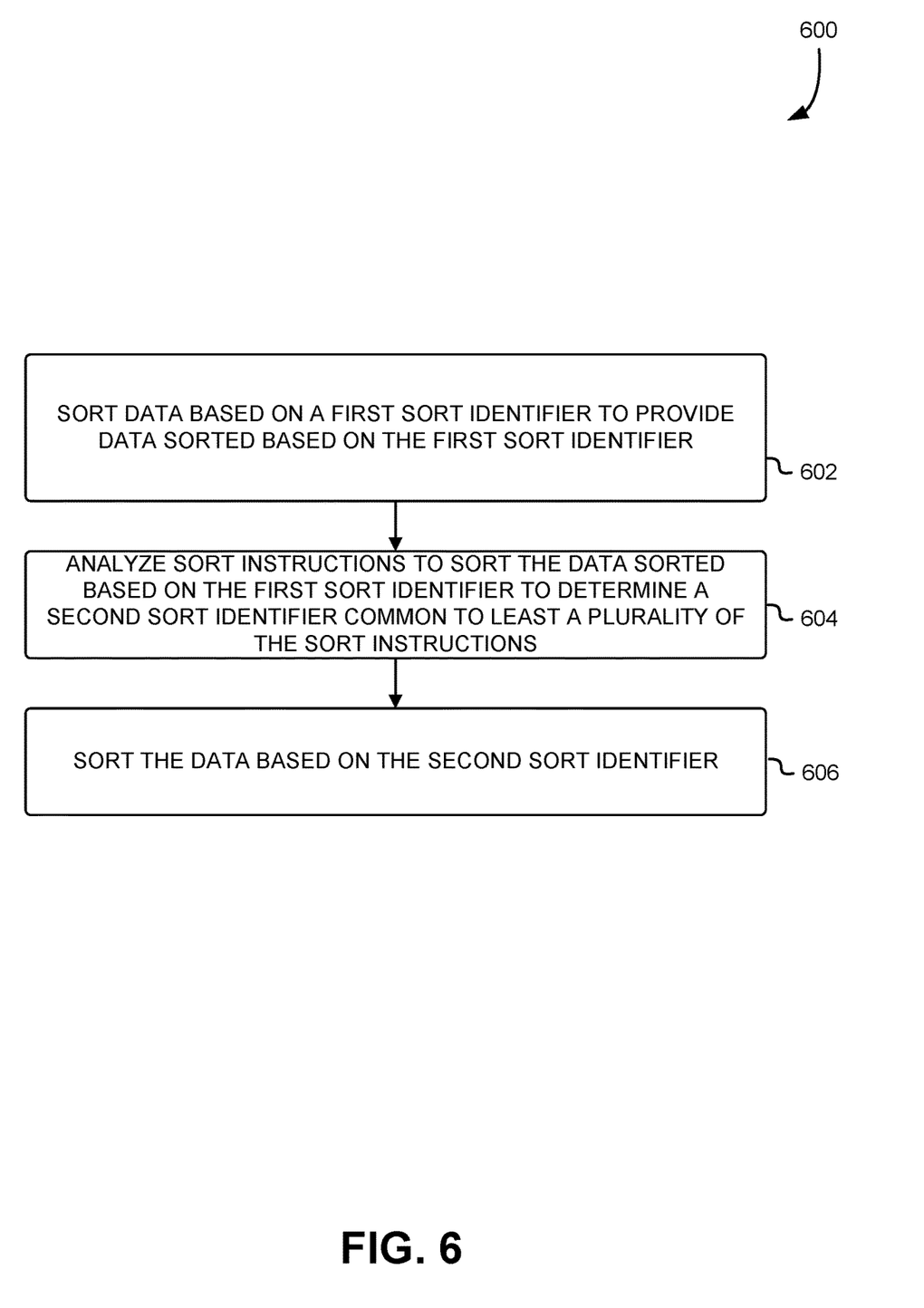
FIG. 6 illustrates an example flow diagram that may be associated with one or more of the described system environments to generate sorted data, according to at least one embodiment.

FIG. 6 illustrates an example flow diagram 600 that may be associated with one or more of the described system environments to generate sorted data, according to at least one embodiment. In some implementations, the acts of the flow diagram 600 are executed by one or more computing devices of the example system environments described herein. The example system environments may execute computer-executable instructions incorporating at least some of the processing acts of the flow diagram 600 to provide generation and use of sorted data, according to at least one of the embodiments described herein.

At 602, data is sorted. In at least one embodiment, the data is associated with a table of data, such as the table of data 204. In at least one embodiment, the data is sorted using a sort identifier to generate sorted data such as sorted one or more tables of data and/or one or more sorted datasets. In at least one embodiment, the sort identifier corresponds to the first sort identifier 212. In at least one embodiment, the data is sorted by the data processing service 106 or the data processing service 206. In at least one embodiment, the first sort identifier is a randomly or subjectively selected sort identifier.

At 604, sort instructions to sort the data sorted based on the first sort identifier are analyzed to determine a second sort identifier common to least a plurality of the sort instructions. In at least one embodiment, the analyzed sort instructions include sort information collected based on a plurality of sort processes to sort data, such as the sort instructions 108 or the sort instructions 222. In at least one embodiment, sort identifiers determined from analyzing the sort instructions can be stored in the computer-implemented storage containing the identifiers 224.

At 606, the data is sorted (e.g., re-sorted) based on the sort second identifier determined to be common to or at least associated with the plurality of the sort instructions. In at least one embodiment, column identifier associated with the structured data set is used to establish a sort identifier. This sort identifier can correspond to the sort identifier 114 or the second sort identifier 234. The sort identifier can be associated with an identifier of structured data comprised in a table of data. The structured data can correspond to columns of data in the table of data. In at least one embodiment, the table of data corresponds to the table of data 110, 112, or 204. The table of data can also correspond to one or more of the sorted data 216-220 In at least one embodiment, the data processing service 106 or the data processing service 206 sorts the data.

Additional acts can be associated with the flow diagram 600. In at least one embodiment, metadata can be analyzed to randomly select the first sort identifier. In at least one embodiment, the additional acts can include analyzing the sort instructions to determine a percentage corresponding to a determined number of times the second sort identifier was found to be associated with the sort instructions to sort data over a predetermined duration; and based on determining the percentage at least equals a percentage threshold, sorting the data based on the second sort identifier. In at least one embodiment, additional acts can include analyzing the sort instructions to determine a percentage corresponding to a determined number of times the second sort identifier was found to be associated with the sort instructions to sort data over a predetermined duration; and based on determining the percentage at least equals a percentage threshold, sorting the data based on the second sort identifier. In at least one embodiment, additional acts can include processing first real-time data writes or queries to data sorted based on the second sort identifier for a duration corresponding to a predetermined duration; and after termination of the duration, processing second real-time data writes or queries to the data sorted based on the first sort identifier.

In at least one embodiment, an act of the flow diagram 600 corresponds to processing first real-time data writes or queries of the data sort based on the sort identifier for a duration corresponding to a predetermined duration. In at least one embodiment, the first real-time data writes are processed against the sorted data. Once the duration has terminated or lapsed, additional real-time data writes or queries, such as second real-time data writes or queries, are processed against data sorted based on the sort identifier. In at least one embodiment, the sort identifier corresponds to the first sort identifier 212, and the sorted data corresponds to the data of sorted data.

Figure 7:
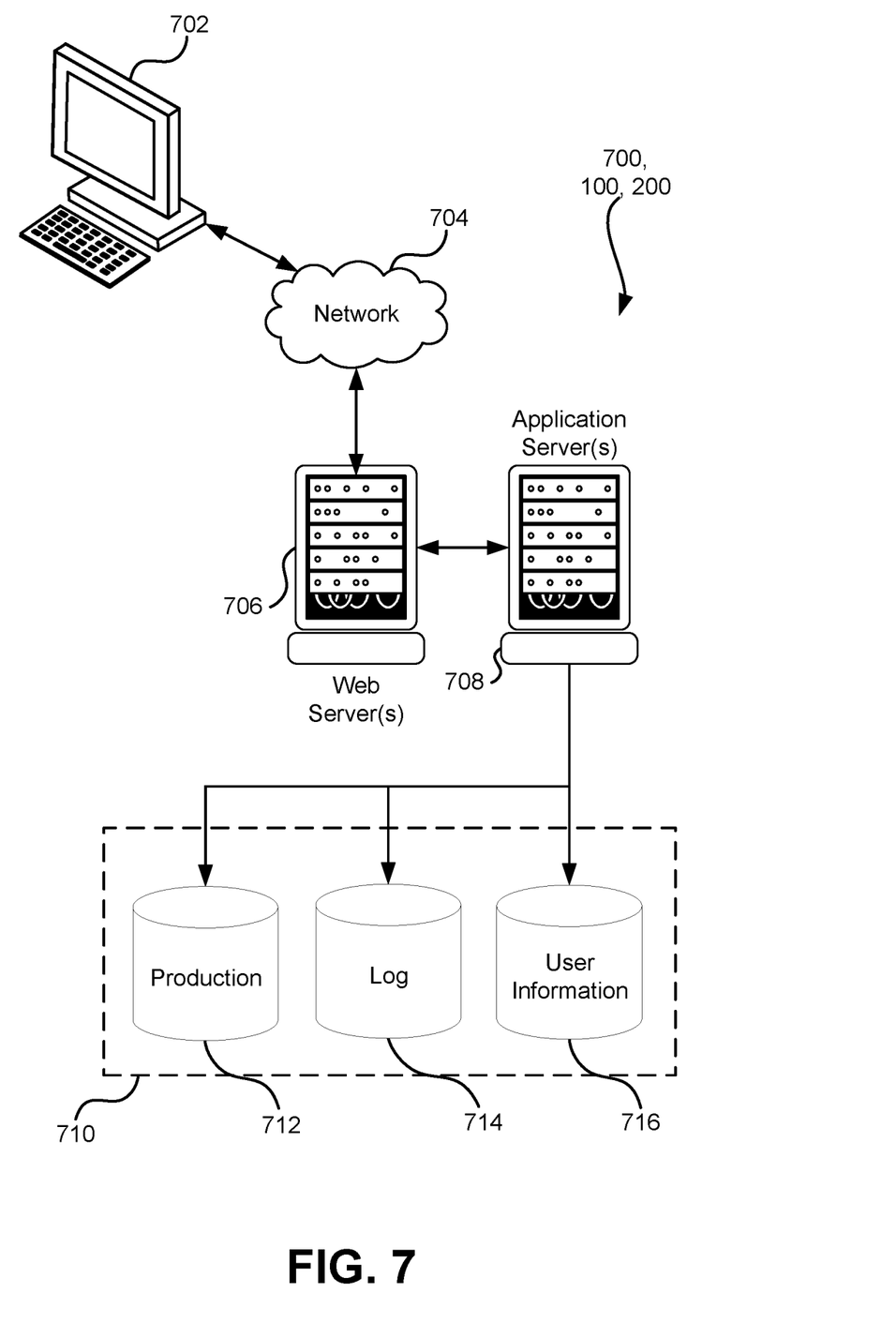
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update, or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java °, C, C #or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   storing a table of data comprising columns of data, each column of data having an associated column identifier;
   selecting a first column identifier of the column identifiers associated with the columns of data;
   sorting the table of data based on the first column identifier;
   analyzing aggregated information associated with sort processes to sort the table of data to determine a sort identifier common to at least a plurality of the sort processes;
   determining the sort identifier corresponds to a second column identifier of the column identifiers associated with the columns of data; and
   sorting the table of data based on the second column identifier.

2. The computer-implemented method of claim 1, further comprising:
   storing sort information over a predetermined duration to generate the aggregated information associated with the sort processes to sort the table of data;
   analyzing the aggregated information associated with the sort processes to sort the table of data to determine a percentage corresponding to a determined number of times the sort identifier was used to sort the table of data;
   determining the percentage at least equals a percentage threshold; and
   based on determining the percentage at least equals the percentage threshold, sorting the table of data based on the second column identifier.

3. The computer-implemented method of claim 1, further comprising:
   processing data writes or queries on the table of data sorted using the second column identifier for a duration corresponding to a predetermined duration;
   determining the duration has lapsed; and
   based on determining the duration has lapsed, processing data writes or queries on a table of data sorted using the first column identifier.

4. The computer-implemented method of claim 1, wherein selecting the first column identifier of the column identifiers associated with the columns of data comprises randomly selecting the first column identifier from the column identifiers associated with the columns of data.

5. A system, comprising:
one or more processors; and
memory that stores computer-executable instructions that are executable by the one or more processors to cause the system to:
  analyze information, stored in computer-implemented storage, associated with instructions to sort data to determine an identifier common to at least a plurality of individual instructions to sort the data;
  determine a correspondence of the identifier to a sort identifier used to sort the data; and
  based on the determined correspondence, sort the data based on the identifier.

6. The system of claim 5, wherein the memory that stores the computer-executable instructions that are executable by the one or more processors are further to cause the system to:
  generate, randomly, the sort identifier based on a first identifier associated with a first structured data set of the data; and
  generate another sort identifier based on a second identifier associated a second structured data set of the data, wherein the other sort identifier corresponds to the identifier.

7. The system of claim 6, wherein the first structured data set is a first column of data comprised in the data and the second structured data set is a second column of data comprised in the data.

8. The system of claim 5, wherein determining the correspondence of the identifier to the sort identifier comprises determining the identifier does not match the sort identifier.

9. The system of claim 5, wherein the memory that stores the computer executable instructions that are executable by the one or more processors are further to cause the system to:
  select, randomly, the sort identifier based on a data identifier associated with a portion of structured data associated with the data.

10. The system of claim 5, wherein the memory that stores the computer-executable instructions that are executable by the one or more processors are further to cause the system to:
  analyze the information to determine a percentage corresponding to a determined number of times the identifier was found to be associated with the instructions to sort data over a predetermined duration; and
  based on determining the percentage at least equals a percentage threshold, sort the data based on the identifier.

11. The system of claim 5, wherein the memory that stores the computer-executable instructions that are executable by the one or more processors are further to cause the system to:
  process first real-time data writes or queries to data sorted based on the identifier for a duration corresponding to a predetermined duration;
  determine the duration has lapsed; and
  based on determining the duration has lapsed, process second real-time data writes or queries to the data sorted based on the sort identifier.

12. The system of claim 11, wherein the memory that stores the computer-executable instructions that are executable by the one or more processors are further to cause the system to:
  determine the predetermined duration from historical information determined from at least the plurality of individual instructions to sort the data based on the identifier.

13. A system, comprising:
one or more processors; and
memory that stores computer-executable instructions that are executable by the one or more processors to cause the system to:
  sort data based on a first sort identifier to provide data sorted based on the first sort identifier;
  analyze sort instructions to sort the data sorted based on the first sort identifier to determine a second sort identifier common to least a plurality of the sort instructions; and
  sort the data based on the second sort identifier.

14. The system of claim 13, wherein sorting the data based on the second sort identifier provides a dataset sorted based on the second sort identifier, and wherein the second sort identifier is determined from an identifier for columnar data comprised in the data.

15. The system of claim 13, wherein the memory that stores the computer-executable instructions that are executable by the one or more processors are further to cause the system to:
  analyze metadata associated the data to randomly select the first sort identifier.

16. The system of claim 15, wherein the metadata comprises the first sort identifier and a plurality of identifiers associated with structured data comprised in the data, and wherein the second sort identifier is comprised in the plurality of identifiers.

17. The system of claim 13, wherein the memory that stores the computer-executable instructions that are executable by the one or more processors are further to cause the system to:
  analyze the sort instructions to determine a percentage corresponding to a determined number of times the second sort identifier was found to be associated with the sort instructions to sort data over a predetermined duration; and
  based on determining the percentage at least equals a percentage threshold, sort the data based on the second sort identifier.

18. The system of claim 13, wherein the memory that stores the computer-executable instructions that are executable by the one or more processors are further to cause the system to:
  process first real-time data writes or queries to data sorted based on the second sort identifier for a duration corresponding to a predetermined duration.

19. The system of claim 18, wherein the memory that stores the computer-executable instructions that are executable by the one or more processors are further to cause the system to:
  after termination of the duration, process second real-time data writes or queries to the data sorted based on the first sort identifier.

20. The system of claim 13, wherein the first sort identifier is a subjectively selected sort identifier corresponding to at least one identifier comprised in a schema for the data.

* * * * *